United States Patent [19]
Piendel et al.

[11] Patent Number: 4,721,433
[45] Date of Patent: Jan. 26, 1988

[54] COOLABLE STATOR STRUCTURE FOR A GAS TURBINE ENGINE

[75] Inventors: John J. Piendel, Manchester; Albert H. McKibbin, Colchester, both of Conn.

[73] Assignee: United Technologies Corporation, Hartford, Conn.

[21] Appl. No.: 810,497

[22] Filed: Dec. 19, 1985

[51] Int. Cl.⁴ .............................................. F01D 25/12
[52] U.S. Cl. ..................................... 415/115; 415/116
[58] Field of Search ............... 415/115, 116, 117, 175, 415/176, 177, 178, 179, 180, 172 A

[56] References Cited

U.S. PATENT DOCUMENTS

| | | | |
|---|---|---|---|
| 2,445,661 | 7/1948 | Constant et al. | 60/41 |
| 2,584,899 | 2/1952 | McLeod | 415/115 |
| 2,625,793 | 1/1953 | Mierley et al. | 60/39.65 |
| 2,859,934 | 11/1958 | Halford et al. | 415/115 |
| 2,973,938 | 3/1961 | Alford | 416/96 R |
| 3,220,697 | 11/1965 | Smuland et al. | 416/96 R |
| 3,362,681 | 1/1968 | Smuland | 415/115 |
| 3,527,543 | 9/1970 | Howald | 416/90 |
| 3,628,880 | 12/1971 | Smuland | 415/115 |
| 3,730,640 | 5/1973 | Rice et al. | 415/172 A |
| 3,742,705 | 7/1973 | Sifford | 415/115 |
| 3,754,766 | 8/1973 | Asplund | 415/172 A |
| 3,807,891 | 4/1974 | McDow et al. | 415/116 |
| 3,990,807 | 11/1976 | Sifford | 415/115 |
| 3,992,126 | 11/1976 | Brown et al. | 415/115 |
| 3,996,354 | 6/1976 | Patterson | 415/116 |
| 4,242,042 | 12/1980 | Schwarz | 415/175 |
| 4,257,222 | 3/1981 | Schwarz | 415/175 |
| 4,353,679 | 10/1982 | Hauser | 415/115 |
| 4,363,599 | 12/1982 | Cline et al. | 415/178 |

FOREIGN PATENT DOCUMENTS

| | | | |
|---|---|---|---|
| 203304 | 9/1956 | Australia . | |
| 214751 | 4/1958 | Australia . | |
| 579316 | 7/1946 | United Kingdom | 415/180 |

Primary Examiner—Robert E. Garrett
Assistant Examiner—John Kwon
Attorney, Agent, or Firm—Gene Fleischhauer

[57] ABSTRACT

A stator assembly 16 for a gas turbine is disclosed. Various construction details which increase the effectiveness of the use of cooling fluid are developed enabling the use of stator vanes which do not have blockable holes for cooling air. In one embodiment, a segmented seal ring extends circumferentially between an array of coolable stator vanes 34 and a casing 22 to block the vane cooling air from convectively transfering heat to the casing.

9 Claims, 2 Drawing Figures

COOLABLE STATOR STRUCTURE FOR A GAS TURBINE ENGINE

DESCRIPTION

1. Technical Field

This invention relates to a gas turbine engine of the type having an outer casing, an annular flow path for working medium gases, and arrays of coolable stator vanes attached to the outer casing which extend radially inwardly across the flow path. Although the invention was conceived during work in the field of industrial gas turbine engines capable of burning particulate matter, such as pulverized coal, the invention is applicable to other fields which employ rotary machines.

2. Background of the Invention

An axial flow, gas turbine engine has a compression section, a combustion section and a turbine section. A rotor assembly extends axially through the engine. The rotor assembly includes rotor disks disposed about an axis of rotation. The disks are in the compression section and the turbine section. An array of rotor blades extends outwardly from each disk. A stator assembly extends axially through the engine and includes an outer casing which extends circumferentially about the arrays of rotor blades. Arrays of stator vanes extend inwardly from the outer casing. Each array of stator vanes is axially adjacent to an array of rotor blades. An annular flow path for working medium gases extends axially through the engine and passes through the arrays of stator vanes and rotor blades in alternating succession.

The stator assembly and the rotor assembly have cooperating seal elements for blocking the leakage of the working medium gases from the flow path. A predetermined operating clearance is provided between the rotating and stationary seal elements. To avoid destructive interference between the elements, the clearance accommodates the initial differences in radial growth between the rotating components, which quickly grow outwardly under operative conditions and stationary components which grow outwardly more slowly. Unexpected decreases in the clearance may cause destructive interference and increases, unexpected or otherwise, will allow working medium gases to escape from the flow path. In either case, engine efficiency is adversely affected.

As the working medium gases are flowed along the flow path, the gases are pressurized in the compression section and burned with fuel in the combustion section to add energy to the gases. The hot, pressurized gases are expanded through the rotor blades of the turbine section to produce work. A major portion of this work is used for useful purposes, such as developing thrust for an aircraft or driving an output turbine or a free turbine of an industrial gas turbine engine. A remaining portion of the work is used to compress the working medium gases in the compression section.

Examples of such constructions are shown in U.S. Pat. No. 2,625,793 issued to Mierley entitled "Gas Turbine Apparatus with Air Cooling Means" and U.S. Pat. No. 3,527,543 issued to Howald entitled "Cooling of Structural Members Particularly for Gas Turbine Engines".

As shown in these patents, cooling air is provided to components which are bathed in the hot working medium gases of the annular flow path to keep the operating temperature of the components within acceptable limits. Such components include the rotor blades of the rotor assembly and the stator vanes of the stator assembly. The first stage vanes are especially of concern because of their close proximity to the combustion chamber.

Mierley is an example of an early construction having coolable first stage vanes. The source of the cooling air for the vanes is the discharge region 13 of the compressor. An inner and outer casing extend circumferentially about the engine to support the vanes. Each casing has contoured slots for loosely receiving the vanes. Each vane has a passage through the interior to permit the flow of cooling air through the vane, and each vane is chordwisely spaced from the casing along at least a portion of the airfoil surface leaving a gap between the vanes and the casing to enable cooling air to flow radially over the exterior of the airfoil surface. After flowing through the vane, the cooling air is exhausted to the working medium flow path through the gap and around the upstream end of the vane. Although the vanes are effectively cooled in Mierley, effective cooling requires relatively high mass flows of cooling air through and over the vane.

The structure shown in Howald represents an advancement in cooling over the concept shown in Mierley and requires relatively smaller amounts of cooling air than Mierley. As shown in Howald, cooling air is flowed from the vane interior through holes in the airfoil to the exterior of the vane. The holes perform two important functions. The first is to provide a film of cooling air to the exterior of the airfoil to shield the airfoil from the hot working medium gases. The second is to provide an outlet for the cooling air which is flowed into the vane through th ends of the vane. This construction has the advantage of using less cooling air than constructions that rely entirely on convection cooling. However, the holes in the airfoil (with the exception of the trailing edge holes 44t) are blockable holes susceptible to plugging by particulate matter that is swept along the working medium flow path. This is an especially serious problem in engines that burn pulverized coal in the combustion chamber.

The use of cooling air increases the service life of the stator vane in comparison to an uncooled stator vane. However, the use of cooling air decreases the operating efficiency of the engine because a portion of the engine's useful work is used to pressurize the cooling air in the compression section. A decrease in the amount of cooling air required to provide a satisfactory service life for components such as a stator vane and the adjacent stator structure increases the work available for providing thrust or powering a free turbine and hence increases the overall engine efficiency.

Accordingly, scientists and engineers are seeking to develop a stator structure for flowing cooling air to a stator vane which aids in preserving engine efficiency and, in one embodiment, avoids the use of blockable cooling holes in the airfoil of the vane.

DISCLOSURE OF INVENTION

This invention is in part predicated on the recognition that cooling air supplied from the high pressure stages of the compressor to the stator vane has a temperature low in comparison to the temperature of the hot working medium gases but high in comparison to the temperature of the casing which supports the stator vanes. As a result, heating of the support casing by such cooling air increases steady state clearance and can cause unexpected discontinuities in thermal growth of the casing, both of which will increase seal clearances and may require the removal of heat by lower temperature cooling air from another location of the engine.

According to the present invention, a stator structure having a casing which supports an array of coolable stator vanes includes a seal means extending circumferentially between the vanes and the casing to block convective heat transfer from the vane cooling air to the casing.

In accordance with one embodiment of the present invention, a stator assembly includes an array of coolable stator vanes that do not rely on blockable cooling holes for cooling the vane and for discharging cooling air from the vane and further includes a seal means extending circumferentially between the vanes and an outer casing to block the cooling air from convectively heating the casing and to direct the cooling air toward an adjacent coolable stator structure.

A primary feature of the present invention is an array of stator vanes which engage a casing. Another feature is a cavity between the vanes and the casing. In one embodiment, a seal ring extends circumferentially about the cavity to divide the cavity into an outer chamber and a plurality of inner chambers, one at each vane, between the seal ring and the array of stator vanes. Another feature is a conduit means for ducting cooling air from the inner chamber to another portion of the stator assembly requiring cooling air. In accordance with one embodiment, the stator assembly includes a second array of stator vanes and a second seal ring which bounds a second outer chamber between the second seal ring and the casing and bounds second inner chambers. These second inner chambers are connected with the inner chambers of the first array of stator vanes. The outer chamber is in flow communication with a source of cooling air at a lower temperature and higher pressure than the cooling air in the inner chambers. Another feature is the airfoil of the vane which does not rely upon blockable cooling air holes for cooling the vane and for discharging cooling air from the vane. A cooling air path extends from a source of cooling air inwardly of the annular flow path for the gas turbine engine through the first vane, through the inner chambers, and through the second vane to a discharge region which is also inwardly of the annular flow path for working medium gases.

A primary advantage of the present invention is the engine efficiency associated with seal clearances between stationary and rotating structure which results from blocking the cooling air for the vanes from contacting the casing which supports the stator vanes. Another advantage is the engine efficiency which results from gathering the cooling air discharged from the first vane and using that cooling air to cool an adjacent stator structure, such as a second stage stator vane. Still another advantage in industrial gas turbine engine applications is the ability to use combustible material containing particulate matter, such as coal dust, without an adverse impact on cooling of turbine vanes which results from eliminating blockable cooling holes in the airfoil and the ability to supply cooling air to the outer chambers to stabilize the temperature of the case.

The foregoing features and advantages of the present invention will become more apparent in light of the following detailed description of the best mode for carrying out the invention and in the accompanying drawings.

BEST MODE FOR CARRYING OUT THE INVENTION

Figure 1:
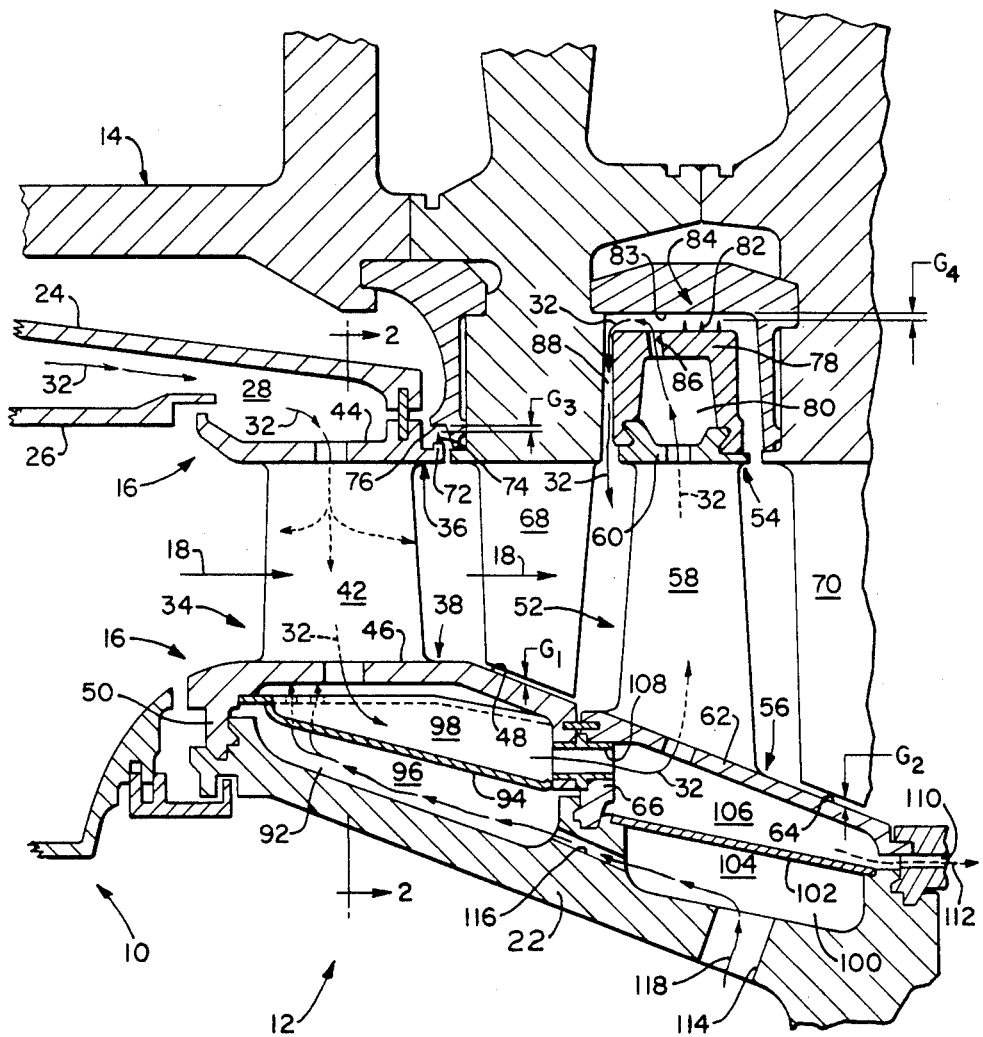
FIG. 1 is a side elevation view of a portion of an axial flow gas turbine engine.

FIG. 1 shows a portion of a combustion section 10 and a turbine section 12 of an axial flow, gas turbine engine. The engine has a longitudinally extending axis $A_r$. A rotor assembly 14 and a stator assembly 16 extend axially through the engine. An annular flow path 18 for working medium gases extends between these assemblies and through the turbine section.

The stator assembly 16 includes an outer casing 22. The outer casing extends circumferentially about the turbine section 12 and outwardly of the annular flow path 18. An inner casing 24 is spaced radially inwardly from the outer casing. The inner casing and adjacent stator structure 26 define a first region 28. The first region is in flow communication via flow path 32 with a source of cooling air. One source of cooling air is the compression section and usually will be the discharge region of the high pressure compressor.

The stator assembly 16 includes a first array of stator vanes, as represented by the single stator vane 34, which extends inwardly from the outer casing. Each stator vane has an inner end 36 and an outer end 38. An airfoil 42 extends between the outer end and the inner end. The vane has an inner platform 44 attached to the airfoil at the inner end of the vane and an outer platform 46 attached to the airfoil at the outer end. As shown, the outer platform extends axially well beyond the airfoil for a distance approximately equal to the axial width of the airfoil and has a frustoconical surface 48 which bounds the working medium flow path. An upstream flange 50 extending outwardly from the platform is integrally attached to the outer casing 22.

The stator assembly 16 includes a second array of stator vanes, as represented by the single stator vane 52, which extends inwardly from the outer casing. Each stator vane has an inner end 54 and an outer end 56. An airfoil 58 extends between the outer end and the inner end. The vane has an inner platform 60 attached to the airfoil and an outer platform 62 attached to the airfoil at the outer end. As shown, the outer platform extends axially well beyond the airfoil for a distance approximately equal to the axial width of the airfoil and has a frustoconical surface 64 which bounds the working medium flow path. A flange 66 extending outwardly from the platform is integrally attached to the outer casing and to outer platform 46 of the first vane.

The rotor assembly 14 has arrays of coolable rotor blades as represented by the first array of rotor blades 68 and the second array of rotor blades 70. The rotor blades extend radially outwardly across the working medium flow path into proximity with the conical surfaces 48 and 64 on the outer platforms of the vanes. The conical surfaces act as an outer air seal to the blades to block the flow of the working medium gases past the tips of the blades. A radial clearance $G_1$ is provided between the first rotor blade and the conical surface 48 and a radial clearance $G_2$ is provided between the second rotor blade and the conical surface 64.

Seal means are provided at other locations in the turbine section between the stator assembly and the rotor assembly to block the leakage of working medium gases. For example, a seal element 72 having a knife edge 74 extends into proximity with a portion of the rotor assembly having a seal land 76. A radial clearance gap $G_3$ is left between these elements. Similarly, a circumferentially extending shroud ring 78 engages the second array of stator vanes 52. The shroud ring has a manifold region 80. A plurality of knife edge elements 82 extend inwardly from the shroud ring into proximity with a cooperating seal land 83 on the rotor assembly to form a seal means 84. A radial gap $G_4$ is left between the knife edge elements and the seal land. The shroud ring is adapted by a hole 86 to discharge cooling air from the manifold into a second region 88 upstream of the seal means 84. The second region extends between the rotor assembly and the stator assembly inwardly of the working medium flow path and is in flow communication with the flow path.

The first array of stator vanes 34 is spaced inwardly from the outer casing leaving a circumferentially extending first cavity 92 therebetween. A seal means, such as a segmented ring 94, extends circumferentially about the cavity. The segmented ring is spaced radially from the array of stator vanes and from the casing. The seal ring divides the cavity into an upstream outer chamber 96 and a plurality of upstream inner chambers, one chamber at each vane, as represented by the single chamber 98. The outer chamber extends circumferentially about the inner chamber and spaces the inner chambers from the outer casing. Alternatively, the ring might be a one-piece construction. In either construction, the outer platform 46 of each vane faces the seal means 94.

The stator vanes 52 of the second array are each spaced inwardly from the outer casing leaving a second cavity 100 therebetween. A second seal means, such as a segmented ring 102, divides the second cavity into a downstream outer chamber 104 and a plurality of downstream inner chambers, one chamber at each vane as represented by the single chamber 106. A plurality of conduit means, as represented by the tube 108, connects each upstream inner chamber with an associated downstream inner chamber.

The flow path 32 for cooling air extends from the first region 28 in a radially outwardly direction through the inner platform 44 of the first vane to the interior of the vane, through the outer platform 46 and into the upstream inner chamber 98. Thence, through the conduit means 108 into the downstream inner chamber 106 and radially inwardly through the outer platform 62, the interior, and the inner platform 60 of the second vane to the shroud ring 78 and thence through hole 86 into the second region 88 which is inwardly of the annular flow path 18 for working medium gases. The flow path then extends into the annular flow path from the second region. In some embodiments, a small portion of the cooling air for the vane may be discharged rearwardly from the second inner chamber via the passage 110 as shown by the broken line 112.

The downstream outer chamber 104 is in flow communication through opening 114 with a source of cooling air. The circumferentially extending downstream outer chamber 104 is connected by a plurality of conduit means, as represented by the passage 116, with the upstream outer chamber 106. A second flow path for cooling air 118 extends through the outer chambers. The second flow path is adapted to flow air having a static pressure which is greater than the static pressure of the cooling air in the inner chambers 98, 106 and a temperature which is much lower than the temperature of the cooling air in the inner chambers. Such a source might be an auxiliary compressor and a means for cooling the air prior to supplying the air to the outer chamber. Another source might be the engine by taking cooling air from a low temperature region of the engine to cool high pressure air with a heat exchanger prior to supplying the air to the outer chamber. Alternatively, the air in the outer chamber might be relatively stagnant air which insulates the outer casing from the heated cooling air in the inner chambers and is provided by eliminating the opening 114.

Figure 2:
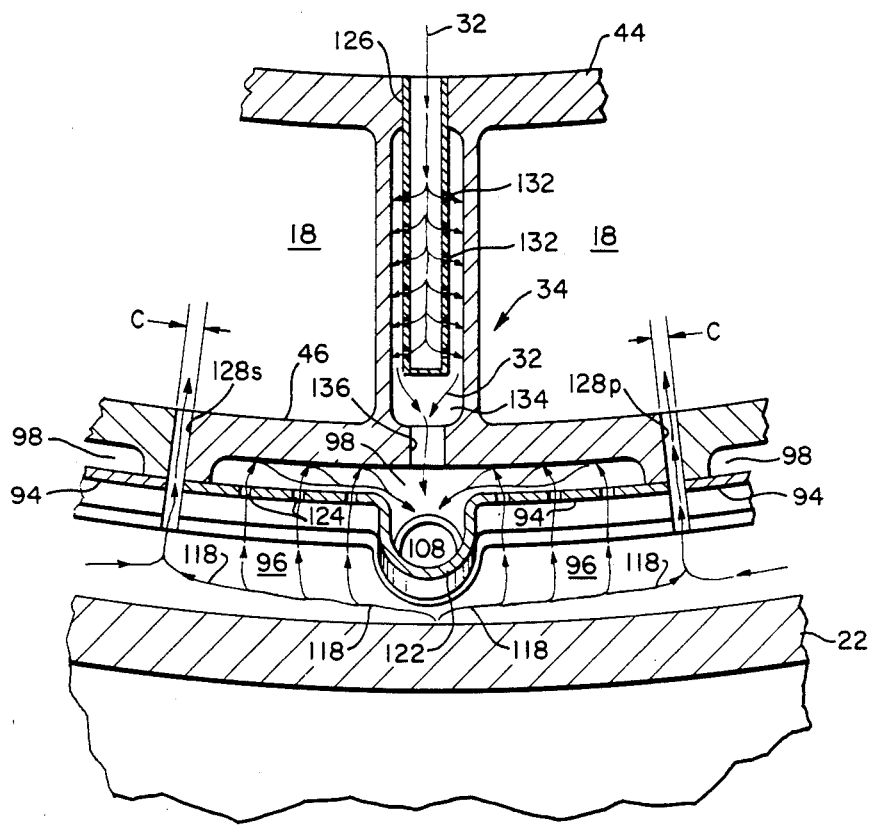
FIG. 2 is a cross-sectional view taken along the lines 2—2 of FIG. 1.

FIG. 2 is a cross-sectional view taken along the lines 2—2 of FIG. 1 to show the interior of the stator vane 34 and the relationship of the circumferentially extending outer chamber 96 to the plurality of inner chambers 98. Each segment of the seal ring 94 has a radially extending portion 122 which channels the flow of cooling air to the tube 108 extending between the inner chambers. The outer chamber is in flow communication with the inner chamber through holes 124 in the seal segment and with the annular flow path 18 through the circumferential gap C between adjacent stator vanes. An impingment tube 126 extends radially inwardly through the inner platform 44 and is in flow communication with the first region 28 for cooling air via the first flow path 32 for cooling air. The impingment tube has an airfoil shape and is spaced chordwisely from the pressure sidewall 128p and the suction sidewall 128s of the vane platform. The impingement tube has a plurality of impingement holes 132 which place the interior of the impingement tube in flow communication with the interior 134 of the airfoil. A plurality of holes 136 places the interior of the airfoil in flow communication with the inner chamber 98.

During operation of the gas turbine engine, hot working medium gases are flowed through the turbine section 12 along the annular flow path 18 for working medium gases. As the gases are flowed along the flow path, heat is transferred from the gas to the stator vanes 34, 52 and the rotor blades 68, 70. Cooling air is flowed along the flow path 32 on the interior of the engine to the inner chambers 98, 106 and along the flow path 118 from the exterior of the engine into the outer chambers 104 and 96. The segmented seal ring 94 blocks the heated cooling air 32 from impacting the casing and causing heating of the casing. Because the seal 74, 76 on the stator vanes and the outer air seal 48 for the rotor blades are integrally attached to the outer casing, blocking this hot vane cooling air from the casing avoids increases and unexpected variations caused by such heating in the gaps $G_1$ and $G_3$ between the rotor assembly and the stator assembly.

Cooling air flowed along the flow path 118 which extends through the outer chambers performs several important functions. The cooling air flowed along the flow path 118 supplies the cooling air required to satisfy cooling needs to the sidewalls of the stator vane platform and leakage requirements through the circumferential gap C. The impingement holes 124 in the seal ring provide for separate cooling of the vane platform 46 and the outer air seal 48 which extends circumferentially about the first array of rotor blades. After impinging on the platform, this cooling air is mixed with the cooling air from the cooling air flowed through the stator vane and proceeds rearwardly in the radial portion 122 of the seal ring.

The cooling air gathered by the seal ring, instead of being discharged directly into the working medium flow path, is flowed along the flow path 32 to a second region such as the downstream inner chamber 106 where the cooling air performs an additional cooling function. The heated vane cooling air is again isolated from the outer casing by the downstream seal means segmented ring 102. Finally, the cooling air is flowed through the downstream stator vane 52 and discharged through the shroud ring into the second region 88 inwardly of the annular flow path where in combination with the seal means 83, the cooling air provides cooling to the adjacent rotor assembly and to the shroud ring and pressurizes the region to block the flow of working medium gases from entering the second region.

Because film cooling is not used for the stator vanes, blockable holes through the airfoils are not required. Eliminating the holes enables the use of particulate generating fuel, such as coal dust, as a combustible material in the combustion chamber without fear of blocking the discharge of cooling air from the vane airfoils. Thus, the seal means permits using a cooling scheme which eliminates blockable cooling air holes in the vanes, but which does not have an adverse impact on seal clearances because of the discharge of a high volume of cooling air on the outer casing.

Although the invention has been shown and described with respect to detailed embodiments thereof, it should be understood by those skilled in the art that various changes in form and detail thereof may be made without departing from the spirit and the scope of the claimed invention.

We claim:

1. In an axial flow rotary machine of the type having an annular flow path for working medium gases which extends axially through the engine about a longitudinal axis, having a first region in flow communication with a source of cooling fluid, a second region in flow communication with the working medium flow path, and having a stator assembly bounding said flow path which includes a casing extending circumferentially about the flow path and an array of coolable stator vanes integrally attached to the casing at a first location, each stator vane extending inwardly from the casing across the working medium flow path, the improvement which comprises:
    seal means spaced radially from the array of vanes and from the casing leaving an outer chamber between the seal means and the casing and a plurality of inner chambers, one at each vane, between the seal means and the array of stator vanes;
    conduit means in flow communication with said inner chambers and said second region;
wherein the first region is radially inwardly of the annular flow path, wherein the second region is not adjacent to the casing and wherein a flow path for cooling fluid extends in a radially outward direction from the first region through the array of coolable stator vanes, into said inner chambers, through the conduit means to the second region and thence into the annular flow path and wherein the outer chamber spaces the flow path for cooling air from the casing at the first location to block the transfer of heat by convection from the vane cooling air to the casing.

2. The stator assembly of claim 1 wherein said seal means is a segmented ring extending circumferentially about the array of stator vanes, each segment engaging an associated stator vane.

3. The stator assembly of claim 2 wherein the flow path for cooling fluid is a first flow path for cooling fluid that has a static pressure and temperature in said inner chamber, and wherein a second flow path for cooling fluid extends through said outer chamber and is in flow communication with a source of cooling fluid, the cooling fluid of the second flow path having a static pressure greater than the static pressure of the first fluid in said inner chamber and a temperature which is less than the temperature of said first fluid.

4. The stator assembly of claim 3 wherein each coolable stator vane has a platform radially facing at least a portion of said seal means, wherein said seal means has a plurality of holes which place the outer chamber in flow communication with the inner chamber such that said second cooling fluid flows as a jet through said holes to increase the convective cooling of said platform.

5. In an axial flow rotary machine of the type having an annular flow path for working medium gases which extends axially through the engine about a longitudinal axis, a first region in flow communication with a source of cooling air, a second region in flow communication with the working medium flow path, and, a stator assembly bounding said flow path which includes a casing which extends circumferentially about the flow path and includes a first array and a second array of stator vanes extending inwardly from the casing across the working medium flow path, the improvement which comprises:
    a first vane of said first array of stator vanes, said first vane having an inner end and an outer end;
    first seal means spaced radially from the first vane and from the casing leaving a first inner chamber between the seal means and the vane and a first outer chamber between the seal means and the casing;
    a second vane of said second array of stator vanes, said second vane having an inner end and an outer end;
    second seal means spaced radially from the second vane and the casing having a second inner chamber between the seal means and the vane and a second outer chamber between the seal means and the casing;
    conduit means extending from said first inner cavity to said second inner cavity;
wherein the first region and the second region are radially inwardly of the annular flow path, wherein a flow path for cooling air extends in a radially outward direction from the first region through the first vane and into the first inner chamber and thence through the conduit means into the second inner chamber and radially inwardly through the second vane to the second region inwardly of the annular flow path and thence into the annular flow path and wherein the first outer chamber and the second outer chambers space the flow path for cooling air from the casing.

6. The stator assembly of claim 5 wherein each outer chamber has an outer flow path for cooling air having a temperature which is less than the temperature of the cooling air in the radially adjacent inner cooling chamber.

7. The stator assembly of claim 6 wherein the first vane has an axially and circumferentially extending outer platform, said first seal means radially faces said platform, said outer casing is adapted to supply cooling air to said outer chamber at a pressure greater than the pressure of the cooling air in said radially adjacent inner chamber, and the seal means is adapted by a plurality of holes to direct cooling air from said outer chamber toward said platform to cool the platform and to mix with the cooling air in said first inner chamber before the air is flowed to said second inner cooling chamber.

8. The stator assembly of claim 7 wherein the first seal means is a segmented ring having a plurality of segments circumferentially spaced one from the other leaving a gap C therebetween and said vanes are circumferentially spaced leaving a gap therebetween and a third flow path for cooling air extends from said outer chamber to the annular flow path through said gaps to cool the axially extending edges on the outer platform of said stator vanes.

9. The stator assembly of claims 1, 2, 3, 4, 5, 6, 7, or 8 wherein the stator vane has an airfoil having no blockable holes for cooling a cooling fluid.

* * * * *